United States Patent
Willett et al.

(10) Patent No.: US 12,117,528 B2
(45) Date of Patent: Oct. 15, 2024

(54) MOBILE 3D IMAGING SYSTEM AND METHOD

(71) Applicant: Arizona Board of Regents on Behalf of the University of Arizona, Tuscon, AZ (US)

(72) Inventors: Isaak Willett, Tucson, AZ (US); Richard Herriman, Tucson, AZ (US); Daniel Inigo, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 447 days.

(21) Appl. No.: 17/431,037

(22) PCT Filed: Feb. 15, 2020

(86) PCT No.: PCT/US2020/018461
§ 371 (c)(1),
(2) Date: Aug. 13, 2021

(87) PCT Pub. No.: WO2020/168313
PCT Pub. Date: Aug. 20, 2020

(65) Prior Publication Data
US 2022/0146677 A1    May 12, 2022

Related U.S. Application Data

(60) Provisional application No. 62/806,620, filed on Feb. 15, 2019.

(51) Int. Cl.
*G01S 17/89*    (2020.01)

(52) U.S. Cl.
CPC .................... *G01S 17/89* (2013.01)

(58) Field of Classification Search
CPC ........... G01S 17/42; G01S 17/87; G01S 17/89
See application file for complete search history.

(56) References Cited

U.S. PATENT DOCUMENTS 11,796,670 B2 * 10/2023 Fang ................. G01S 17/931
2007/0279615 A1   12/2007 Degnan et al.
(Continued)

FOREIGN PATENT DOCUMENTS

| CN | 111108507 A | * | 5/2020 | ........... G01S 13/867 |
| DE | 112021005607 T5 | * | 8/2023 | ............ B60W 10/06 |

(Continued)

OTHER PUBLICATIONS

Yutian Wu et al., Deep 3D Object Detection Networks Using LiDAR Data: A Review, Jan. 15, 2021, IEEE Sensors Journal, vol. 21, Issue 2, pp. 1152-1171 (Year: 2021).*

(Continued)

*Primary Examiner* — Mi'schita' Henson
(74) *Attorney, Agent, or Firm* — Cozen O'Connor

(57) ABSTRACT

A system and method for object detection in 3-dimensional space uses a ground up model that makes detecting objects faster and more accurate by combining the error correction and object detection, while also using flat planes as a basis for the mathematics. Two or more 3D scanning devices, such as scanning LIDARs, collect a 3D dataset for a field of view (FOV). The FOV is divided into boxes with a small degree of overlap, then each box is processed iteratively to identify features of an object contained within the box. Box size is chosen so that the portion of the object contained within the box can be assumed to be planar. Adjoining boxes are evaluated for shared data points then merged it the form part of the same object.

17 Claims, 10 Drawing Sheets

(56) References Cited

U.S. PATENT DOCUMENTS

| | | | |
|---|---|---|---|
| 2010/0098327 A1 | 4/2010 | Se et al. | |
| 2016/0047895 A1 | 2/2016 | Dussan | |
| 2016/0049765 A1 | 2/2016 | Eldada | |
| 2017/0038581 A1 | 2/2017 | Gilboa et al. | |
| 2017/0153319 A1 | 6/2017 | Villeneuve et al. | |
| 2017/0219713 A1 | 8/2017 | Gruver et al. | |
| 2017/0227645 A1 | 8/2017 | Swope et al. | |
| 2019/0011529 A1* | 1/2019 | Choi | G06V 20/10 |
| 2021/0183093 A1* | 6/2021 | Park | G06V 20/588 |
| 2021/0342609 A1* | 11/2021 | Smolyanskiy | B60W 60/0027 |
| 2022/0012466 A1* | 1/2022 | Taghavi | G06T 7/73 |
| 2022/0244740 A1* | 8/2022 | Jiang | G06T 7/579 |

FOREIGN PATENT DOCUMENTS

| | | | | |
|---|---|---|---|---|
| EP | 2843590 A2 * | 3/2015 | | G01B 11/02 |
| EP | 3620817 A1 * | 3/2020 | | G01S 13/726 |
| KR | 102313944 B1 * | 10/2021 | | G01S 17/89 |

OTHER PUBLICATIONS

Jack N.C. Hayton, CNN-based Human Detection Using a 3D LiDAR onboard a UAV, Apr. 15-17, 2020, 2020 IEEE International Conference on Autonomous Robot Systems and Competitions, pp. 312-318 (Year: 2020).*

PCT Application No. PCT/US2020/018461, International Search Report and Written Opinion, dated Jun. 12, 2020, 16 pages.

* cited by examiner

MOBILE 3D IMAGING SYSTEM AND METHOD

CROSS-REFERENCE TO RELATED APPLICATIONS

The present application claims priority to U.S. Provisional Patent Applications 62/806,620 filed Feb. 15, 2019 titled DRONE BASED LIDAR SCANNER the contents of which are incorporated herein by reference in their entirety.

BACKGROUND

Many fields are incorporating an ability to develop useful insights from a 3D scan of an area of interest. For example, self-driving cars need to identify and respond to other vehicles and objects along the path they are traveling. Likewise, the fields of agriculture and surveying are incorporating 3D scanning devices to collect data about a field of view (FOV) and develop useful insights, for example, regarding vegetation health or location. Often, mobile platforms such as drones are used to collect 3D data, referred to as a point cloud.

Point clouds may include millions of data points that must be processed to detect objects and develop other meaningful data, often in real time. Prior art object detection typically includes mapping mathematical functions to surfaces that appear in the FOV. Once a function is determined, individual points in the point cloud may be excluded by clustering and calculating exceedances. However, this method is problematic for several reasons. First, error correction on these types of surfaces is difficult since error points are including in the mapping function. Second, it is very computationally intensive to do error correction so many good points may be excluded in addition to the bad points. This tends to reduce accuracy and make object detection very time intensive.

Further, resolution requirements make it quite challenging for drones to maintain the flight duration needed to create a high-resolution map. Other challenges in the current use of LIDAR for object detection include the condition that the edge of the LIDAR path has less dense point data (less resolution) than at the center, LIDAR is incapable of acquiring points between defined steps on a 360-degree sweep, and existing LIDAR technologies are expensive.

Thus, there is a need for object detection in a 3D scanning system that has less computational intensity and provides a more accurate object detection list.

SUMMARY

In embodiments, an apparatus and method for object detection in 3-dimensional space uses a ground up model that makes detecting objects faster and more accurate by combining the error correction and object detection, while also using flat planes as a basis for the mathematics. This approach is built upon the concept that real life objects all reduce to flat 2-dimensional planes existing at some orientation in a 3-dimensional space when we take a small enough delta area of a large object's surface. Accordingly, instead of mapping functions to surfaces, the apparatus and method finds statistically relevant flat planes in very small delta area sections. Points are thrown out until variance is small enough, ensuring statistical relevance while also reducing error correction workload. This solves the two previously mentioned problems, reduces computational intensity, and creates a much more accurate object detection list in the process.

In embodiments, detecting objects in 3-dimensional space in real-time includes dividing a 3D point dataset, or point cloud, into boxes, then processing each box iteratively to features of an object. Box size is chosen so that the portion of the object contained within the box can be assumed to be planar. Individual boxes are processed to detect planes, then adjoining boxes are evaluated for shared data points then merged if they form part of the same object. This "bottom-up" processing incorporates error correction into the object detection process. In certain embodiments, the algorithm may also include neural networking, with or without predefined classes, for certain applications. Object detection may be performed in real time, or post collection by using real time kinematics (RTK) for precise tracking of location (e.g., GPS). Two or more 3D scanning devices, such as scanning LIDARs, are used to achieve the needed resolution. The scanning devices may be stationary or mounted on a mobile platform as needed to collect data from the desired field of view (FOV).

DETAILED DESCRIPTION OF THE EMBODIMENTS

Three-dimensional (3D) point datasets, or point clouds, may be acquired by many different types of 3D scanning devices. LIDAR (Light Detection and Ranging) is a technology for determining distance based on the active emission of light pulses (usually in the 600-1500 nm range) and accurate measurement of the return signal. The technology serves multiple disciplines from navigation, obstacle detection and avoidance, terrain mapping, and situational awareness. A more recent derivative application of LIDAR in ecosystem science is the estimation of plant shape and volume. The distance measured by the LIDAR sensor may be converted to above-ground height, which is related to the shape and volume of the object. While expensive LIDAR systems serve most research and application requirements, the cost is extremely high and often prohibitive for more general applications. As such, current technology remains expensive, data intensive, not easily deployable, and inaccessible to many application-oriented disciplines, such as precision agriculture and plant phenotyping.

LIDAR devices may be mounted on a stationary or mobile platform. A mobile platform may encompass, for example, a ground vehicle, an air-borne vehicle such as a drone or aircraft, or a space-based vehicle such as a satellite. Embodiments below are discussed with reference to a drone-mounted LIDAR system, however, any type of 3D scanner that is stationary or mounted on any type of vehicle may be used, as long as the combined platform is capable of generating a 3D point cloud with the FOV required for a preferred application.

In embodiments, a drone based LIDAR scanner system is deployed on a drone and is capable of scanning a 100×100 m field, from 10-40 m above the canopy, enabling collection of a very dense point cloud (~10×10 cm resolution) of 1,000,000 points, for example. This is a sufficiently dense point cloud to support phenotyping (shape) and biomass (volume) estimation.

Figure 1:
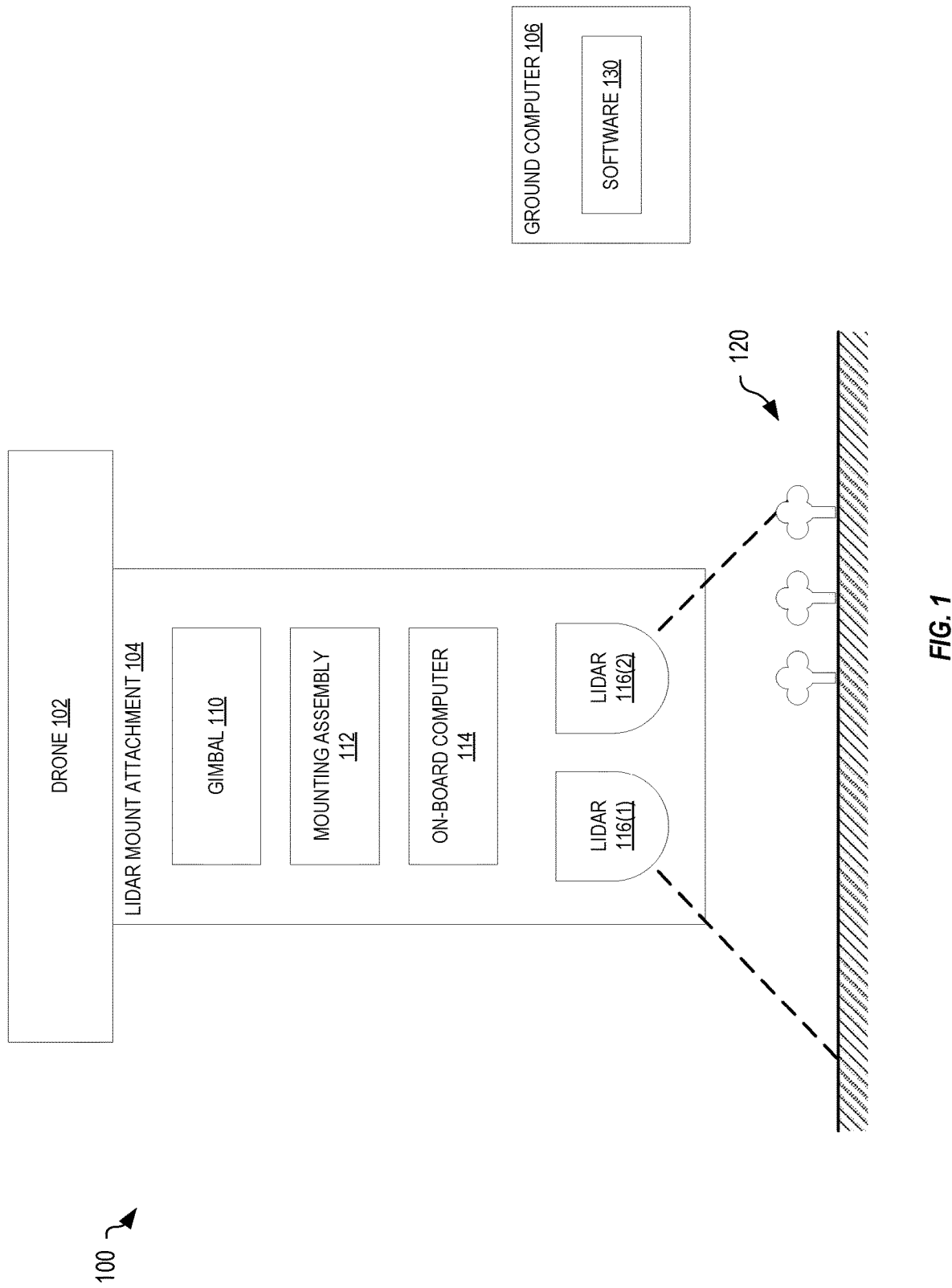
FIG. 1 depicts a drone based LIDAR scanning apparatus, in an embodiment.

FIG. 1 depicts drone based LIDAR scanner system 100. A LIDAR mount attachment 104 attaches to drone 102 and includes a gimbal 110, mounting assembly 112, an on board computer 114 and at least two scanning LIDARs 116(1) and 116(2). In embodiments, mounting assembly 112 secures LIDARs 116(1) and 116(2) and couples through the gimbal 110 to the drone 102. Gimbal 110 acts as a mechanical connection between the LIDARs 116 and the drone 102, and serves to data correct by reducing effects of wind flow during the flight. In alternative embodiments, mounting assembly 112 and gimbal 110 may be any component that securely attaches LIDAR 116(1) and 116(2) to drone 102 so that they may be controlled to scan a FOV.

On-board computer 114 may include a real-time clock (RTC), a global positioning system (GPS), a processor and software operable to control LIDARs 116(1) and 116(2) to collect a 3D point cloud as drone 102 passes over field 120. In embodiments, LIDAR data is processed in real time. In alternative embodiments, RTC and GPS data is collected with LIDAR data and stored onto a removable memory medium, such as an SD card, which may be read by a ground computer 106 for processing later.

The ground computer 106 includes software 130 (e.g., machine readable instructions stored on computer readable media and executable by a processor) necessary to operate the drone 102 and the on-board computer 114, and may include operational code, data-correction code, and data analysis software (e.g., one or more algorithms) and accompanying GUI. However, in certain embodiments, at least part of software 130 may be implemented on the drone 102. For example, software running on on-board computer 114 may implement data correction and/or data formatting. The operational code collects data and may allow the use of real time kinematics (RTK) to improve the accuracy of the collected data.

Figure 2:
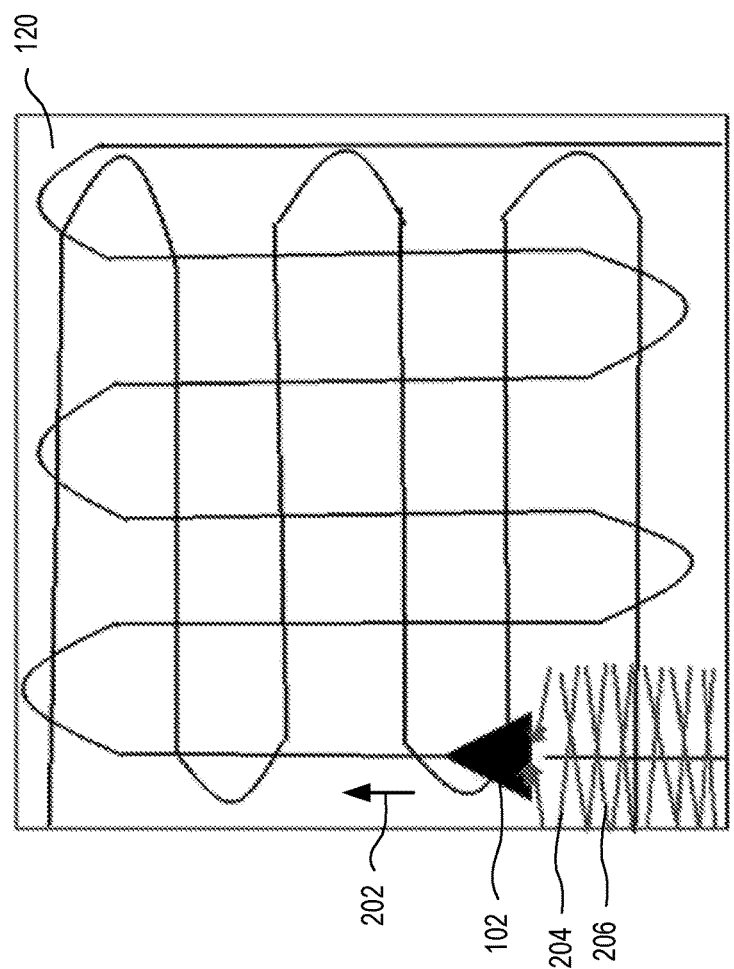
FIG. 2 is a schematic showing an exemplary flightpath of the drone over a field of view and illustrating overlapping scans of the two rear-facing LIDAR, in an embodiment.

In embodiments, LIDARs 116(1) and 116(2) are mounted to face a direction that is opposite of the forward motion of the drone with a scanning plane of each LIDAR perpendicular to the path of the drone. The scanning directions of LIDARs 116(1) and 116(2) may be opposite one another and overlapping, as shown in FIG. 2. A schematic of an exemplary flightpath 202 of the drone 102 over the field 120, is depicted in FIG. 2, illustrating overlapping scans 204, 206 of the two rearwards-facing LIDARs 116(1) and 116(2). To obtain a desired resolution of data points, the drone 102 may fly over the field 120 at least two times with the second flightpath perpendicular to the first flightpath (crosshatching). With this method, a minimum of 8 million data points may be obtained from the two scanning LIDAR 116 over a 33-minute interval, including roughly 2 minutes of initializing, landing, and looping around all while not collecting data. The drone based LIDAR scanner system 100 is thus capable of resolving points within 4 cm in every direction. Although a representative scanning pattern and orientation has been described, any scanning pattern and attachment of 3D scanning devices that is capable of acquiring sufficient data for object detection may be used.

Figure 3:
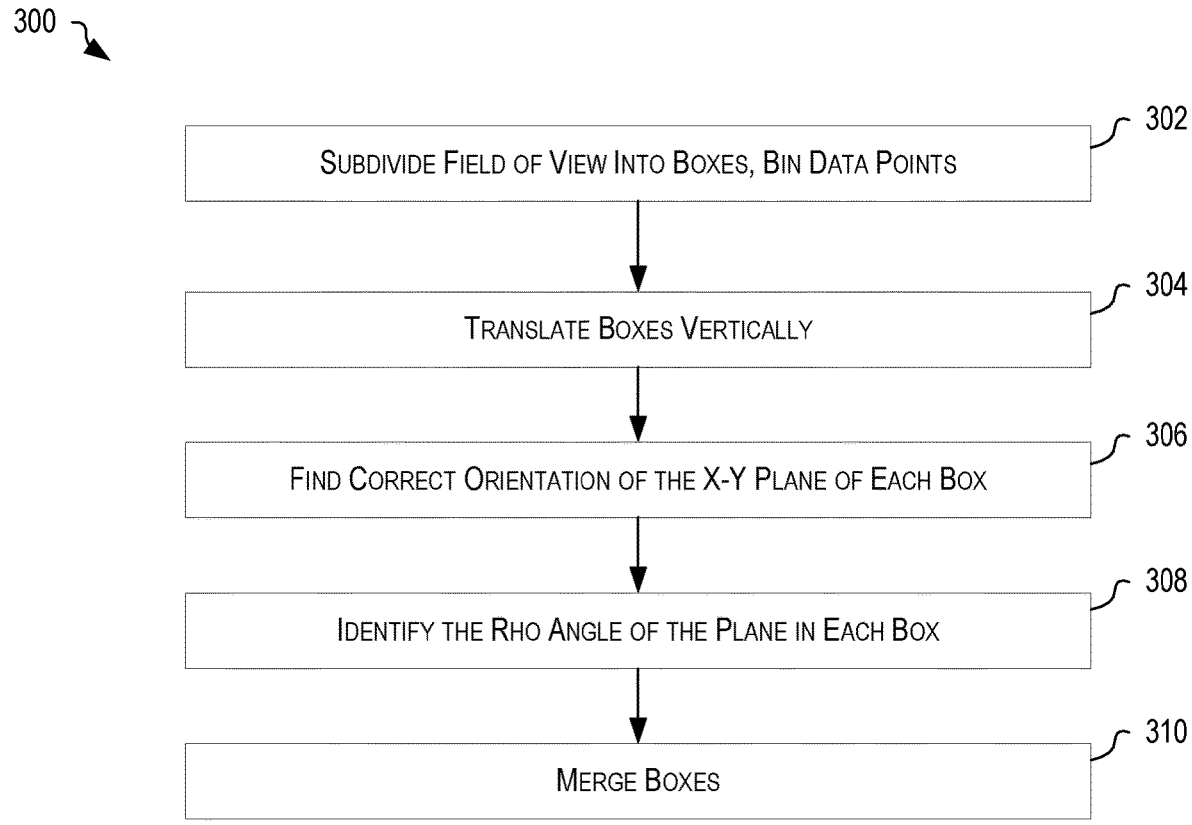
FIG. 3 is a flowchart of method 300 for object detection, in an embodiment.

FIG. 3 depicts a flowchart of a method 300 for object detection using a 3D point cloud, in an embodiment. A 3D point cloud acquired by LIDARs 116(1) and 116(2) may be method 300 may be used with a data set processed as an XYZ or DEM (digital elevation model) value map. In alternative embodiments, any data set that includes depth and cartesian coordinates may be used as long as it specifies objects in 3D space with a large number of points, for example, thousands of data points. Further, data points may be expressed in (x, y, z) format, or in polar coordinates.

FIG. 3 is a flowchart illustrating one example a method 300 for object detection. In block 302, the scanned FOV is divided into a set of boxes, which an overlap between adjacent boxes. As will be described in more detail with reference to FIG. 4, box dimensions are determined based on the overall dimensions of the scanned FOV and a granularity required for accurate object detection. In embodiments, a machine learning process may be used to determine box dimensions. After a set of boxes is determined, data points from the 3D point cloud are assigned to boxes, or binned.

In blocks 304-308, each box is processed separately. In embodiments, boxes may be processed iteratively or in parallel depending on available computer processing equipment.

In block 304, each box is transformed vertically by finding the lowest z in the box and subtracting that value from all z's in the box. This step removes ground plane data points to improve the speed and accuracy of subsequent processing. As will be described in more detail in connection with FIG. 5, to ensure the ground is not included, where the Z-offset is zero, plus or minus a very small delta within the bounds of 3D point cloud, all points that are within the delta of zero are removed. The Z-offset is recalculated and if its absolute value is within the delta of zero, then this step is repeated. When the Z-offset is not within the delta of zero, then the ground is not included and no points are removed.

In block 306, the correct orientation of the X-Y plane of each box is found. In an example of block 306, a rotation matrix $R_z$ is used to rotate the data points in a box around the z axis to find a set of at least 10 or more z points that form a slope and angle with the x-axis. As will be described in more detail in connection with FIG. 6, block 306 will result in a box containing data points that have been aligned on the correct axis.

In block 308, the p angle of the plane in each box is identified. When box dimensions are small enough, then a small enough area slice of an object is taken so that the object is reduced to planar delta areas. Using this assumption, the planes in each of the boxes are determined. In an example of block 308, each box is processed to determine every point in the box that is in the plane, as well as the angle and orientation of the plane. Further details of block 308 will be described in connection with FIG. 7.

In block 310, after object detection has been performed on all boxes in the 3D point cloud, the boxes are merged to produces a final list of detected objects in FOV 800. FOV 800 includes an x-axis, a y-axis and a z-axis as shown. Where two boxes have objects that share points (e.g., based on the location of the object previously determined and stored), the boxes are merged. Where there are no shared points, the boxes are not merged. Note that the boxes overlap to allow an object detected in two different boxes to share points. For example, starting at the top left corner of the field of view, where boxes to the bottom or to the right have objects that share points, the boxes are merged, and the object list updated. By scanning the field of view in this manner, computational workload is reduced since only these novel edges of adjacent boxes can include overlap.

Figure 4:
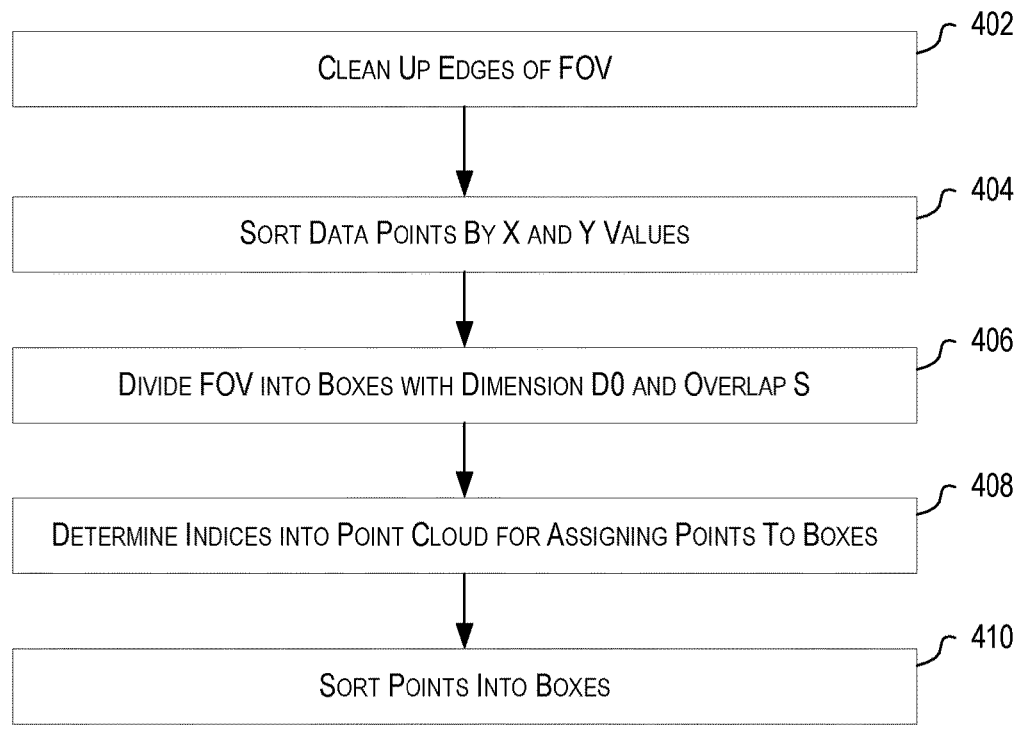
FIG. 4 is a more detailed flowchart of block 302 of FIG. 3.
Figure 8:
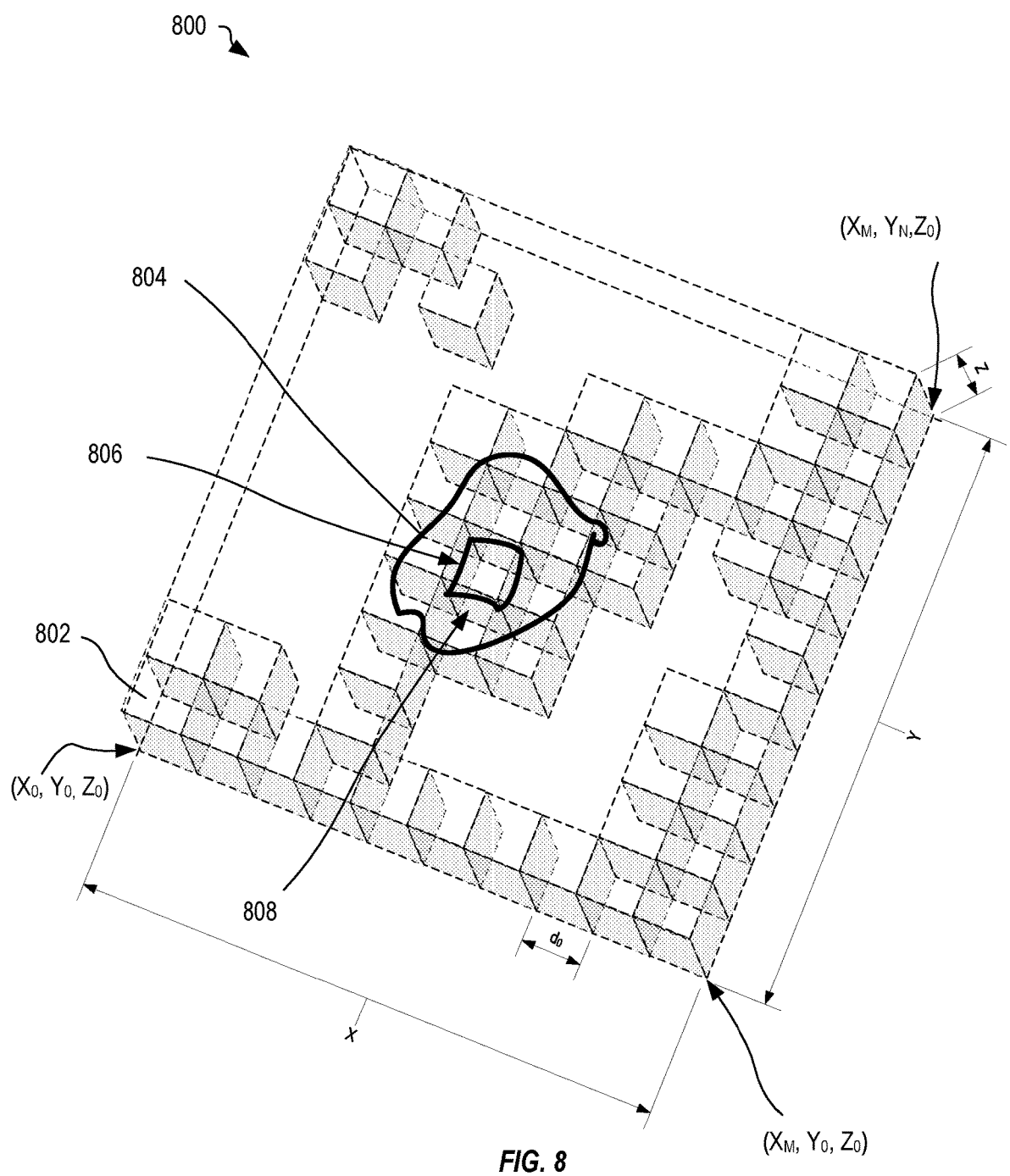
FIG. 8 is a diagram of a field of view (FOV) divided into boxes, in an embodiment.

A more detailed description of block 302 in FIG. 3 is depicted in the flowchart of FIG. 4. A representation of a Field of View (FOV) is shown in FIG. 8. FIGS. 4 and 8 should be considered together in the following description. A 3D point cloud acquired by LIDARS 116(1) and 116(2) is provided as an XYZ or LAS file. Based on the dimensions X and Y of a FOV 800 as shown in FIG. 8, scanning parameters of the LIDARs and a general knowledge of objects in FOV 800, a length and width for boxes to use in subsequent processing is chosen. In embodiments, this length and width is approximately 10 cm. In block 402, points along or outside the edges of FOV 800 are cleaned up. In an example of block 402, an origin $(X_0, Y_0)$ of FOV 800 is identified, the least extreme x point, $X_0$, and the least extreme y point, $Y_0$, are found. These extreme points are subtracted from all points in the point cloud. As shown in FIG. 8, FOV 800 extends from $X_0$ to $X_M$ and $Y_0$ to $Y_N$. The z dimension of data points in the FOV is variable. An object 804 includes a planar area 806 in box(n, m) 808. In embodiments, block 402 is optional and eliminates negative space on the leading edges of the FOV in the case where, for example, the point cloud has negative x and y data points acquired by a sweeping type of LIDAR. In embodiments, data corresponding to the cleaned up FOV is stored in a database, for example, MySQL; however, other languages and databases may be used). For example, the data may be stored on a server for future neural network applications, and use of a database makes the data a lot faster to access as compared to using a text file.

In block 404, the data points are sorted by X values, in ascending order, and sorted by Y in ascending order. In an example of block 404, this sorting is a dataset transformation to make it easier to sort through the data points. In block 406, FOV 800 is divided into boxes of a chosen dimension, called do. FIG. 8 depicts a partial set of boxes 802, 808 for ease of illustration but in embodiments, FOV 800 is divided into boxes. An important step is to overlap the boxes very slightly (e.g., 10% of leading edges overlap), and this region may be called the $oV_{kl}$ where K and L are indices in the 2-dimensional box array. For ease of illustration, overlap areas are not shown in FIG. 8. Each box may be defined as having an x-axis, a y-axis and a z-axis aligned with the axes of FOV 800.

In block 408, X and Y indices corresponding to box edges are determined. In an example of block 408, the boxes are saved in a 2-dimensional array that is of dimension (bCx*bCy) For example, a two-dimensional matrix may be used, where $X_{MAX}$=max $x$ dimension in field, $Y_{MAX}$=max $y$ dimension in field, $X_{box}$=num $x$ boxes with $s$ % overlap, giving:

$X_0=0;$ $X_1=(1-s)*d_0;$ $X_2=2*d_0-s*d_0*2=2*(1-s)d_0;$ $X_3=3*d_0-s*d_0*3=3*(1-s)d_0;$ and $X_n=n*d_0-s*d_0*n=n*d_0(1-s).$ In block 410, points are sorted into boxes according to the indices determined in block 408. In an example of block 410, for each box, find the starting point, the first point that falls in that range. Then from that index in the x list, move to finding the first y in the list, this is possible because of earlier sorting. When reached add that point to the boxes list, move forward by index until x and y are not both in the boxes bound, add all these points to the box. Repeat this step for each box, filling each with the points that belong within that area of space in the point cloud, resulting in a filled two-dimensional matrix of boxes that each contain their correctly bounded points in space. An individual point may be sorted into more than one box, due to overlap s.

Figure 5:
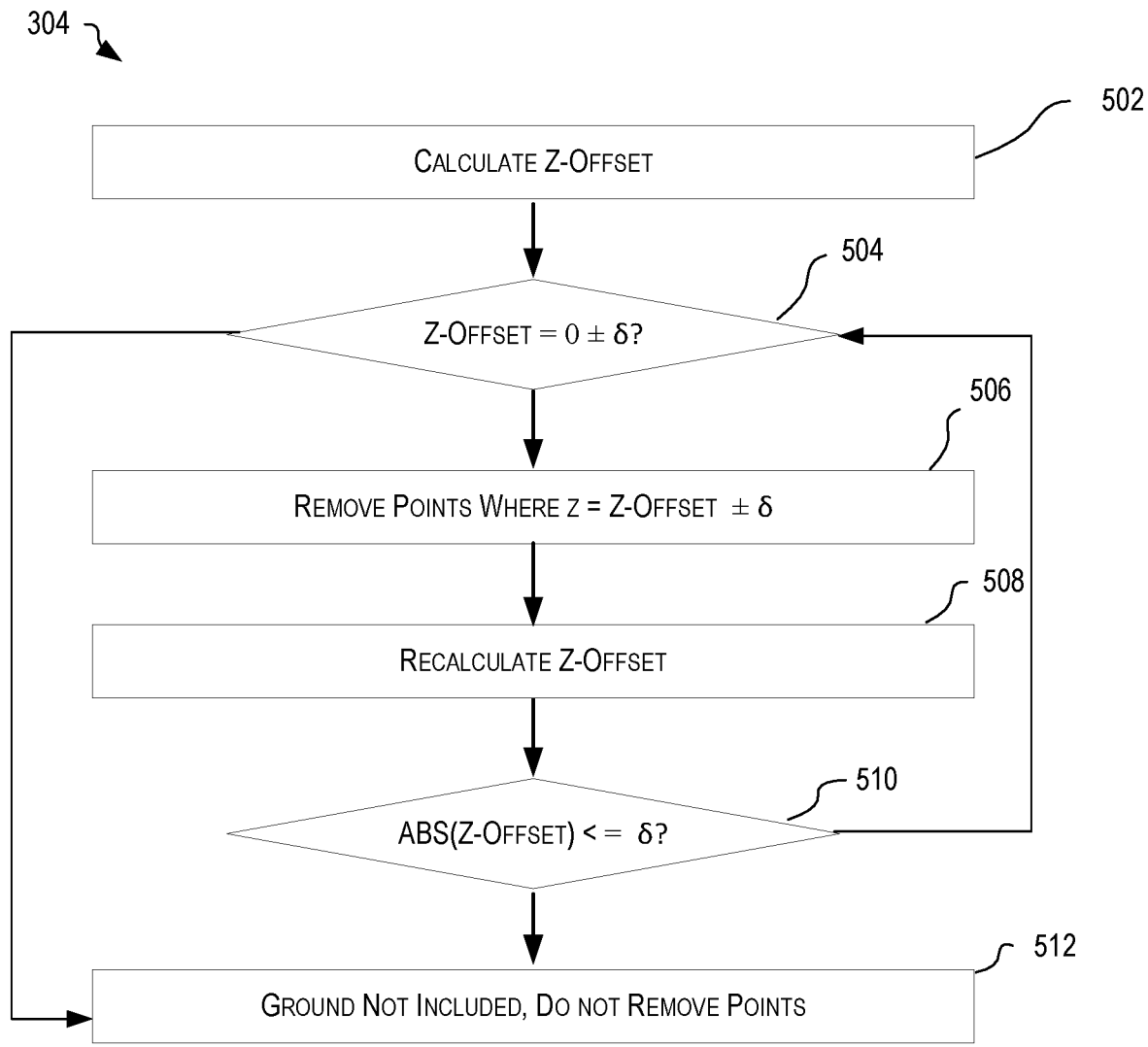
FIG. 5 is a more detailed flowchart of block 304 of FIG. 3.

A more detailed description of block 304 in FIG. 3 is depicted in the flowchart of FIG. 5. A representation of a Field of View (FOV) is shown in FIG. 8. FIGS. 5 and 8 should be considered together in the following description. The flowchart of FIG. 5 is iterated for each box(n, m) in the FOV, starting with n=0, m=0, for example, box 802, although any box in FOV 800 may be selected as a starting point. As shown in FIG. 8, FOV 800 may include an object 804. Although only a single object is shown for clarity of illustration, many objects may be present within FOV 800. Processing speed may be increased by removing points within boxes that correspond to the ground, or background plane of the FOV.

In block 502, determine lowest z value of all points in box(n,m). In an example of block 502, this minimum height value is saved as Z-Offset. In block 504, it is determined if Z-Offset=0±$\delta_1$, where $\delta_1$ is a very small value, within the error bounds of the LIDAR or 3D scanning device used to acquire the point cloud. If so, then in block 506, remove all points in box(n, m) with z=Z-Offset±$\delta_1$ followed by block 508 where the Z-Offset is recalculated, then 510, where it is determined if the absolute value of Z-Offset is within $\delta_1$. If so, the method returns to block 504.

In block 504, if Z-Offset≠0±$\delta_1$, the method proceeds to block 512 and no points are removed from box (n, m).

Figure 6:
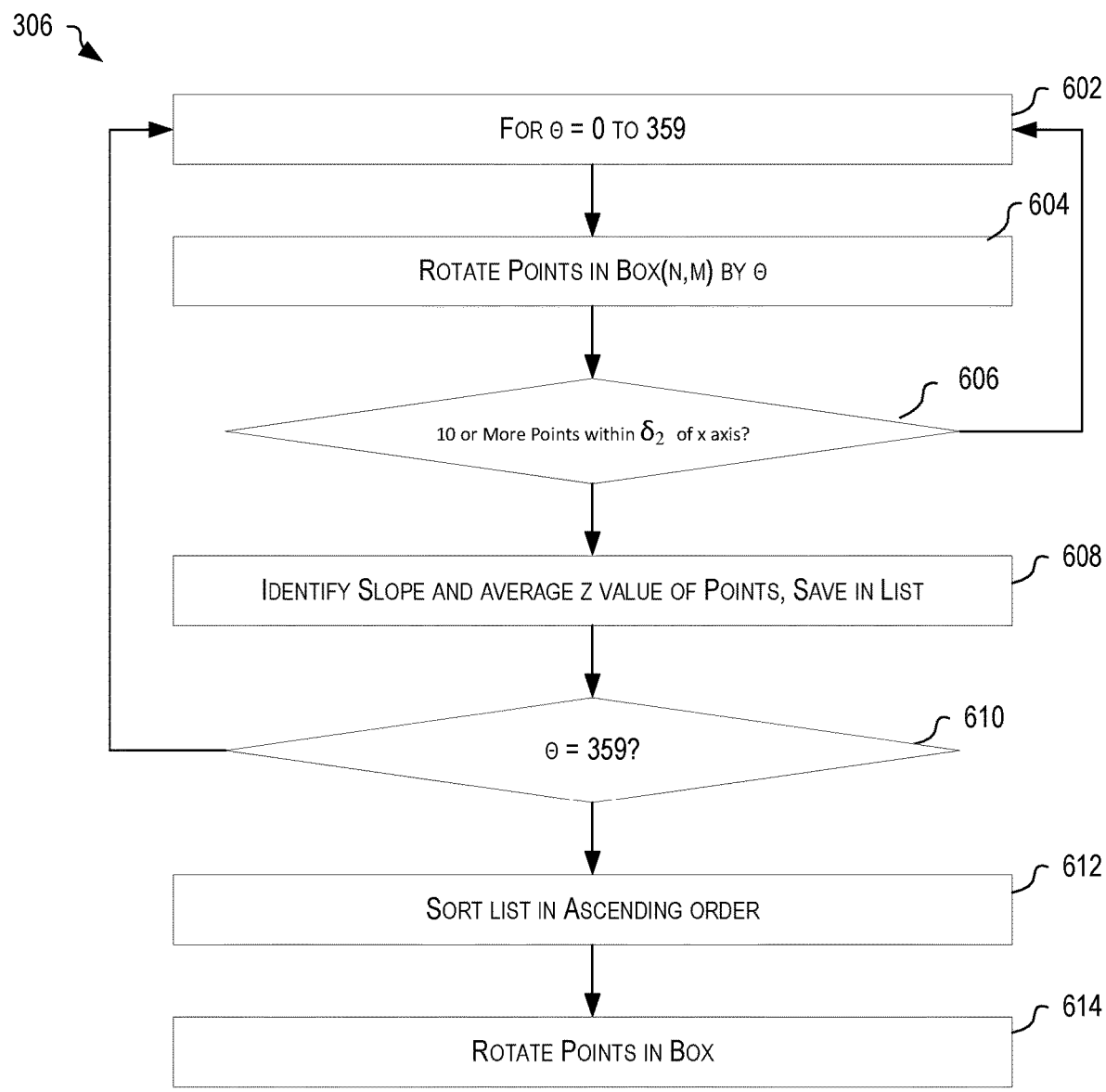
FIG. 6 is a more detailed flowchart of block 306 of FIG. 3.

A more detailed description of block 306 of FIG. 3 is depicted in the flowchart of FIG. 6. A representation of a Field of View (FOV) is shown in FIG. 8. FIGS. 6 and 8 should be considered together in the following description. The flowchart of FIG. 6 is iterated for each box(n,m) in the FOV, starting with n=0, m=0, for example, box 802.

In embodiments, the flowchart of FIG. 6 depicts a method for determining an orientation and minimum slope of the data points in a box relative to the x-axis. In block 602, start a processing loop using θ=0 to 359 as a counter. In block 604, all points in box(n, m) are rotated. In an example of block 604, points are rotated around the z axis by multiplying each point as represented by a vector (x, y, z) with a rotation matrix having the form $$R_z = \begin{bmatrix} \cos(\theta), & -\sin(\theta), & 0 \\ \sin(\theta), & \cos(\theta), & 0 \\ 0 & 0 & 1 \end{bmatrix}$$

In block 606, it is determined if 10 or more rotated points are within a $\delta_2$ of the x-axis. In an example of block 606, all rotated points put into a list and examined to see how many are within $\delta_2$ of the x-axis. In embodiments, $\delta_2$ is related to the angular resolution of LIDARs or pixel resolution of imagery.

If there are less than 10 points within $\delta_2$ of the x-axis, the method writes a dummy value of (1000, θ, 0) to a list of vectors and returns to block 602, incrementing 0. If there are more than 10 points within $\delta_2$ of the x-axis, the method proceeds to block 608, to identify a slope and average z value (z-Ave) of the determined points. In an example of block 608, a method of linear regression shown below may be used but other methods of determining a slope may be used.

1. Take the slope to determine an error value, which should be zero if the points all line up perfectly as x=0, is the line along the x-axis.
2. Take the average z value, z-Ave, of the points along the x-axis.
3. Save this value to the vector list, along with the current value of 0 having the form (slope, theta, z-Ave).

In block 610, if θ is less than 359, θ is incremented by 1 and the method returns to block 602, otherwise it continues to block 612.

In block 612, the vector list, which has an entry for each value of θ, i.e. 360 entries, is sorted in ascending order. In an example of block 612, the vector list is sorted by slope, then by z-Ave. The first entry in the list is then identified as the minimum slope (Real-Slope) and correct orientation (Real-θ) with respect to the x-axis. In embodiments, sorting the vector list in ascending order ensures that, if the object in box(n, m) is very planar, the method identifies the lower of multiple leading edges that will inevitably be found in such a case, i.e. a very normal flat object where we are taking a section of the surface.

In block 614, rotate the points in the box using a new rotation matrix. In an example of block 614, a new rotation matrix $R_{Real}$ is created using the value of Real-θ determined in block 612 and data in box (n, m) is rotated by the new rotation matrix:

$$R_{Real} = \begin{bmatrix} \cos(Real - \theta), & -\sin(Real - \theta), & 0 \\ \sin(Real - \theta), & \cos(Real - \theta), & 0 \\ 0 & 0 & 1 \end{bmatrix}$$

Upon completion go block 614, the data points in box(n, m) are aligned on the x-axis.

Figure 7:
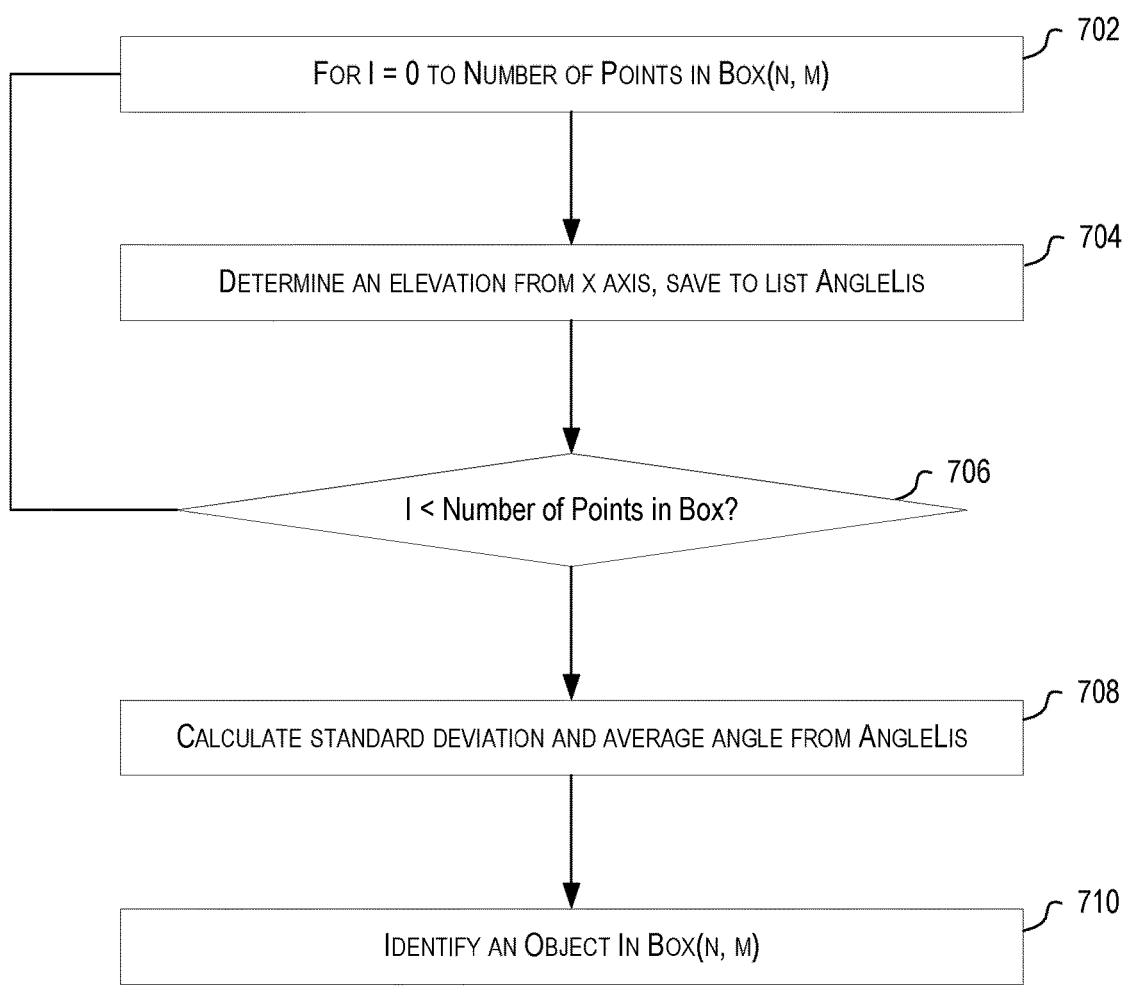
FIG. 7 is a more detailed flowchart of block 308 of FIG. 3.

A more detailed description of block 308 of FIG. 3 is depicted in the flowchart of FIG. 7. A representation of a Field of View (FOV) is shown in FIG. 8. FIGS. 7 and 8 should be considered together in the following description. The flowchart of FIG. 7 is iterated for each box(n,m) in the FOV, starting with n=0, m=0, for example, box 802.

In embodiments, the flowchart of FIG. 7 depicts a method for identifying a ρ angle in a box(n, m). In block 702, start a processing loop using i=0 to the total number of points in box(n, m) as a counter.

In block 704, determine an elevation from the x-axis for each point i in box(n, m). In an example of block 704, the elevation is calculated as an angle ρ using the formula:

$$\rho = \tan^{-1}\frac{y}{z}.$$

The calculated angle ρ is saved to a list AngleLis. In block 706, is i is less than the number of points in box(n, m), i is incremented and the method returns to block 702.

In block 708, a standard deviation and average angle is calculated using AngleLis. In an example of block 708, points with an error greater than 2 degrees are iteratively removed. In embodiments, a number of methods may be used with block 708: not aligning to a normal (0, 1), aligning to a normal (0, 1), and using a Gamma Distribution with machine learning.

An embodiment of a method that does not align to a normal (0, 1) includes the following steps:

1. Subtract the average angle from every point in the list and take the absolute value to get the error away from the average.
2. Iterate through the list and remove any points from box(n, m) having an error of greater than two degrees. The selection of an error amount is related to characteristics of the LIDARs or measurement instrument being used. In embodiments, two degrees is used because, if the angle ρ is larger than that it makes sense it wouldn't be in the plane. In further embodiments, machine learning may also be used to determine the error amount.

In evaluating this embodiment, several factors should be considered. Benefits of this embodiment include the fact that a very fine filter on the points in the plane is achievable without losing any of the points in the data set if the instrumentation captures a very good data set. This embodiment also has very low standard deviation and error. In contrast, this embodiment does not include much machine learning or statistically relevant results, it is more of a blunt force approach.

An embodiment of aligning to a normal(0, 1) includes the following steps:

1. Subtract the average from each point in the list.
2. Divide each point by the standard deviation. This may be assumed to result in a normal distribution with average 0 and standard deviation 1.
3. Remove all points 2 standard deviations away from 0 from box (n, m), should be anything greater than 2 or less than −2.
4. Multiply all points by previous standard deviation then add the previous average.
5. Recalculate average and standard deviation and overwrite the previous results. If the standard deviation is less than 1 degree, all the bad data points have been removed from the list, ie: the ones not in the plane. If the standard deviation is greater than one degree, the list still contains erroneous data and needs to be reduced further, so the method returns to step 1 with the new average and standard deviation.

In evaluating this embodiment, several factors should be considered. Benefits of this embodiment are a more rigorous statistical approach that can address high error samples in a rigorous manner. Detractions are that it will remove good data points if the set has a very low standard deviation however, this can be compensated for as obj detection will take place regardless in this high accuracy case.

An embodiment of using a Gamma Distribution with machine learning includes machine learning and creating profiles that can be used to map objects that are not totally planar. In an example of this embodiment, a gamma function may be created for known certain types of objects when the user enters them into the algorithm. This allows the creation of an adaptive CFAR (constant false alarm rate) for different pre-defined conditions. Creating a gamma function in real time during operation creates confidence that it matches to each of the gamma functions previously created.

In box 710, an object in box(n, m) is identified as a plane having an angle and orientation. In an example of box 710, the average angle and standard deviation are saved in box(n, m), which now includes every point in box(n, m) that is in the plane, the angle of the plane, and its orientation. With this information, the method has determined an object for box(n, m), this object is added to a list of objects in all boxes, ObjsDet, and the method returns block 304 of FIG. 3 for the next box in FOV 800.

After object detection has been performed on all boxes in the 3D point cloud, resulting in the list of objects ObjsDet, the objects are merged to produces a final list of detected objects in FOV 800, as described above in connection with block 310. In an example of block 310, the method iterates through the list ObjsDet, to evaluate if any objects share points. The order of moving through ObjsDet may be chosen to reduce computation flow. Where two boxes have objects that share points, the boxes are merged. Where there are no shared points, the boxes are not merged. Note that the boxes overlap to allow an object detected in two different boxes to share points. For example, starting at the top left corner of the field of view, where boxes to the bottom or to the right have objects that share points, the boxes are merged, and the object list updated. By scanning the field of view in this manner, computational workload is reduced since only these novel edges of adjacent boxes can include overlap.

Output

During the object detection method of FIG. 3 or at a subsequent time, the 3D point cloud and/or detected objects may be plotted and displayed. In embodiments, data points from the merged boxes are translated into LAS (LASer format used with LIDAR point cloud data) format. An LAS format allows the data to be plotted, controlled, scaled and colored based on relevant parameters. When method 300 is used to scan a FOV encompassing vegetation, volume and biomass estimations may be displayed with colored 3D models of the field vegetation. Individual plants may be emphasized with a unique value of K to distinguish different plant species. An LAS file may be plotted by a game engine such as the Unity™ Engine from Unity Technologies™, although any 3D plotting software may be used.

Post Flight Processing

Figure 9:
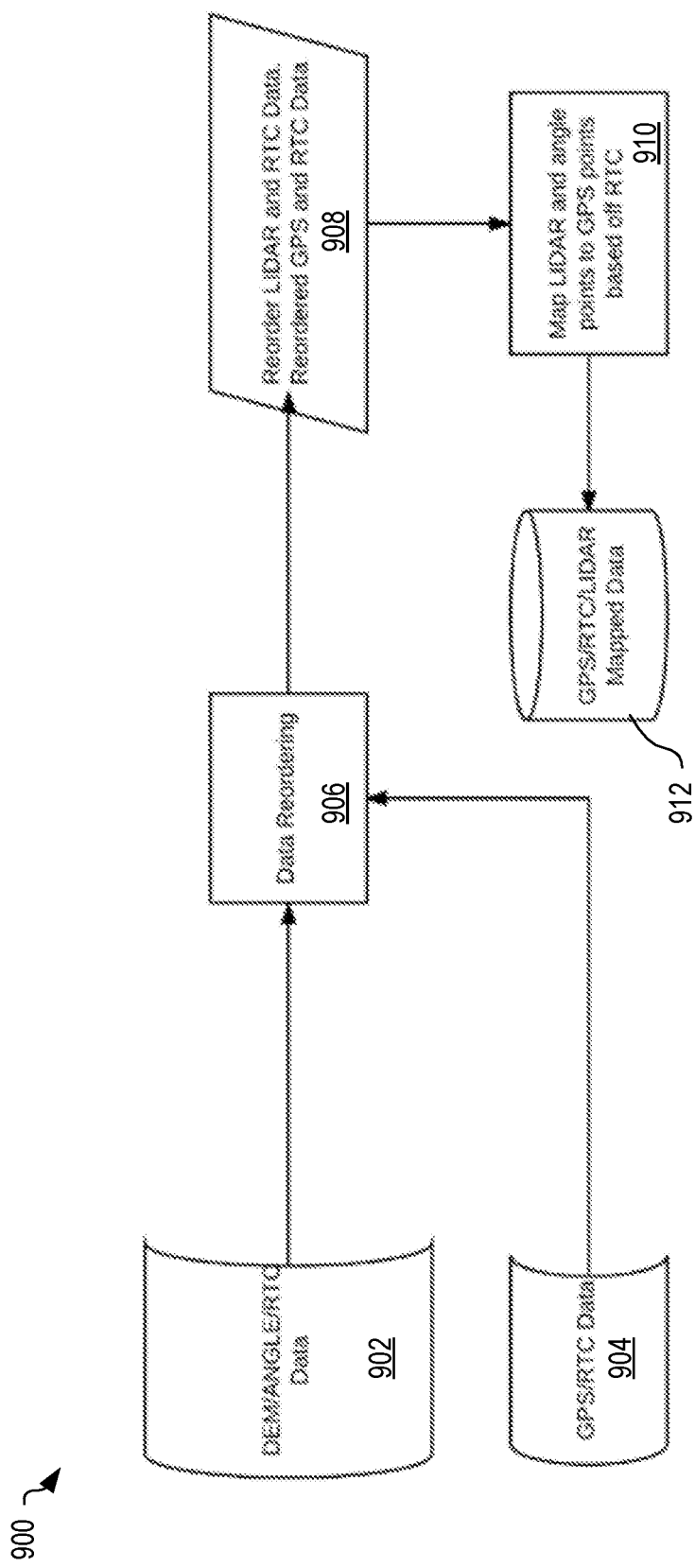
FIG. 9 is a flowchart showing one example method for processing collected LIDAR data, in an embodiment.

In further embodiments, LIDAR data may be scanned and stored on drone based LIDAR scanner system 100 or an equivalent platform for later processing, instead of processing the data in real time. FIG. 9 is a flowchart showing one example a method 900 for processing the collected LIDAR data (specifically how data from each board, LIDAR/RTC/GPS, is taken and matched up based upon time taken from millisecond crystal, e.g., the RTC). The collected data points are categorized together into an easy to access and standard data format. A primary objective of the method 900 of FIG. 9 is the computational identification of objects in the collected LIDAR data. The objective was originally to identify plants in a field, since these are the most difficult objects to successfully phenotype.

Specifically, in blocks 902 and 904, data is captured, as RTC, GPS, DISTANCE, ANGLE, and OFFSET, to a common file location that may be accessed for further processing. In block 906, the data is reordered by first pulling in the data from the different external storage files (e.g., as uploaded to a folder on the processing computer). In block 908, the files are then parsed into separate lists, each containing data points in the format specified in operational code. A list of lists is then created and each list is run through an algorithm to reorder data by RTC coordinate. The RTC coordinates are then compared across lists and the LIDAR data points are saved with a corresponding GPS coordinate (the GPS at the same RTC). In block 910, the lists are combined into one universal list with proper geometric offsets written. The lists are then rescanned to find any data points absent of a corresponding GPS. If there exists an RTC within an acceptable time frame, currently 5 microseconds, the data is paired, otherwise it is discarded. In block 912, a new list of all data points matched to RTC coordinates is then saved to a common location and provided directly to the user as their data for processing according to the flowchart of FIG. 10.

Figure 10:
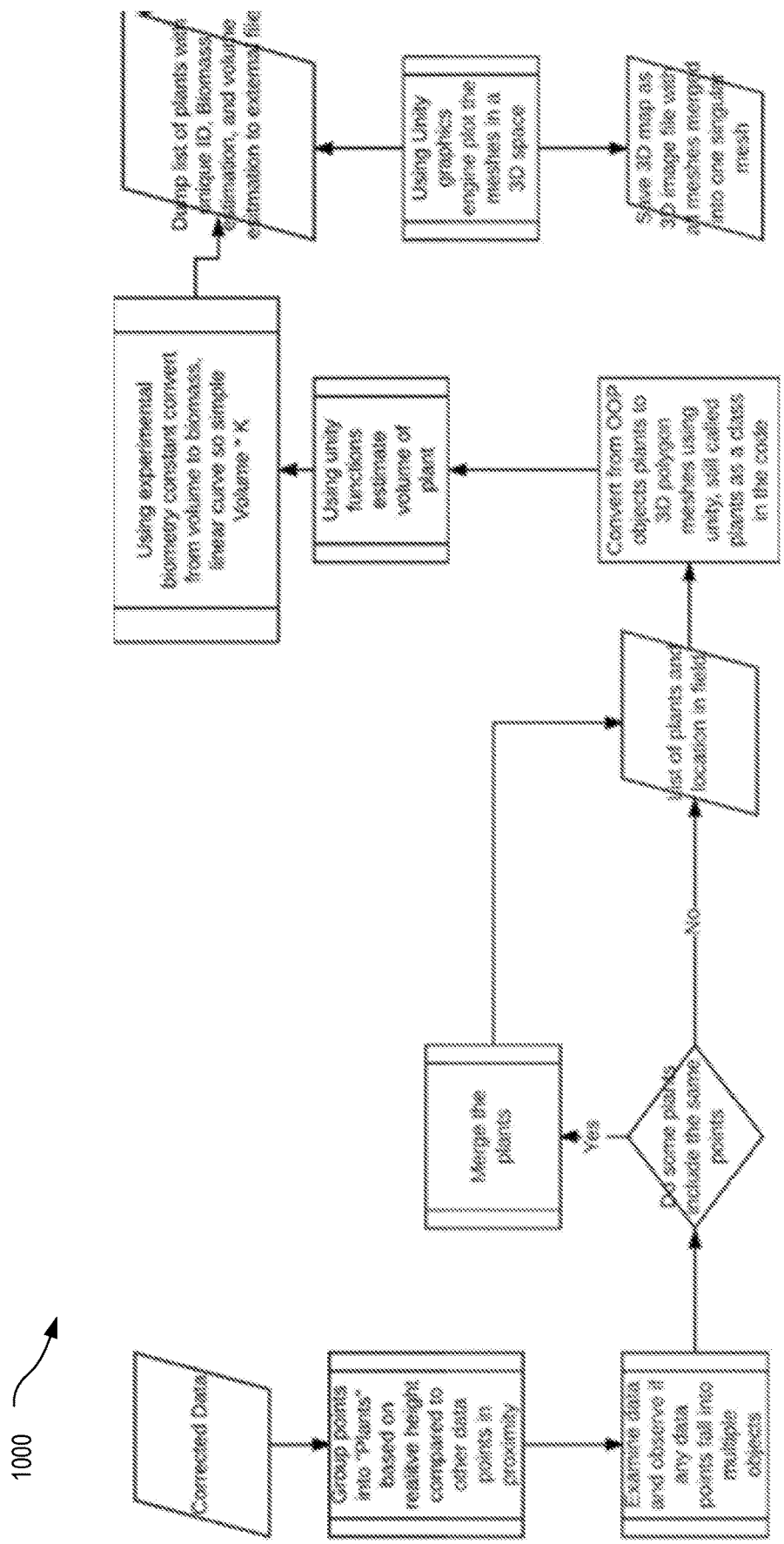
FIG. 10 is a flowchart illustrating one example method for volume estimation using the corrected data from the method of FIG. 9, in an embodiment.

FIG. 10 is a flowchart illustrating one example method 1000 for volume estimation using the corrected data from method 900 of FIG. 9. The corrected data (e.g., a list of data points) may be treated as vectors in C #: they have distance, angle, and GPS (a two-dimensional value). After geometrically converting these four values into three dimensional vectors they are fed into the Unity Engine. The Unity Engine allows for the creation of meshes out of these vectors by using them as vertices for triangles. These two-dimensional triangles, in 3D space, are then saved to a common list in Unity and called a mesh, a three-dimensional object constructed by using the triangles as face estimations of the object. Unity then contains volume functions that are used to evaluate the volume of objects formed from triangles, i.e., meshes. This may also be exported to blender via a python script, an option for keeping the program entirely in one language.

In embodiments, a third-party geographic information system, for example, ArcGis, may assist by exporting the LAS data and allowing the server-side calculations to identify objects in field. ArcGis plots the LAS data and then use object and height detection methods to split the data and heat map or interpolate volume.

Summary of Results:

The method described herein detects objects in each box of a 3D point cloud describing a FOV. This delivers a list of all the objects detected in the FOV with a high degree of accuracy. Such objects could be output to a controller on a car, space ship, plane, and any system that benefits from high accuracy object detection. Any acquired data points that have depth and cartesian coordinates may be used with the method of FIG. 3 elicit a super high accuracy object list from the data. Further, the method self-data corrects in the detection step, severely reducing computational workload as compared to conventional data analysis techniques.

Benefits of the disclosed apparatus and method include more cost efficient in real time systems, lower steps in algorithm yields faster results; more accurate results, much higher accuracy in tests and real-world scenarios and limitless applications. The method may be applied to any 3-D point dataset including LIDAR. Further, the method may be applied to self-driving vehicles, automation, surveying, agriculture, aerospace, etc. as it provides for the detection any object desired at near perfect accuracy.

Combinations of Features

Features described above as well as those claimed below may be combined in various ways without departing from the scope hereof. The following enumerated examples illustrate some possible, non-limiting combinations:

(A1) A mobile 3D imaging system of identifying objects in a field of view (FOV) includes mobile platform; a plurality of 3D scanning devices attached to the mobile platform; and a processor and a memory storing machine readable instructions that, when executed by the processor, control the mobile platform and the plurality of 3D scanning devices to acquire a 3D point cloud describing the FOV as the mobile platform moves through the FOV; wherein the processor further executes machine readable instructions to analyze the 3D point cloud and identify objects in the field of view; and wherein the 3D scanning devices have overlapping fields of view and opposite scan directions.

(A2) In mobile 3D imaging system (A1), the plurality of 3D scanning devices further comprises scanning LIDARs.

(A3) In mobile 3D imaging system (A1) or (A2), the 3D scanning devices are attached to the mobile platform facing rearwards relative to a direction of travel of the mobile platform.

(B1) A method of analyzing a 3D point cloud acquired over a field of view (FOV) having dimensions $X_{MAX}$ and $Y_{MAX}$, said method performed by comprising instructions stored on computer-readable media, wherein the instructions, when executed by a computer, perform the method of dividing the 3D point cloud into a plurality of boxes having a length and width, with adjacent boxes overlapping; processing each box of the plurality of boxes to identify an object in said each box by: removing data points from said each box having a height approximately equal to a minimum height of points in the FOV; aligning the data points in said each box to an x-axis; and determining a ρ angle of a plane defined by the data points of said each box and identifying an object as a plane having an angle and orientation; and merging boxes having overlapping points to define an object list.

(C1) A system for identifying objects in a field of view (FOV) includes a mobile platform; a plurality of 3D scanning devices attached to the mobile platform wherein the plurality of 3D scanning devices has overlapping fields of view and opposite scan directions; and a processor and a memory storing machine readable instructions that, when executed by the processor, control the mobile platform and the plurality of 3D scanning devices to acquire a 3D point cloud describing the FOV as the mobile platform moves through the FOV; wherein the processor further executes machine readable instructions to analyze the 3D point cloud and detect objects in the FOV by: dividing the 3D point cloud into a plurality of overlapping boxes having a length and width; processing each box of the plurality of boxes to identify an object in said each box by: removing data points from said each box having a height approximately equal to a minimum height of points in the FOV; aligning the data points in said each box to an x-axis; and determining a ρ angle of a plane defined by the data points of said each box and identifying an object as a plane having an angle and orientation; and merging boxes having overlapping points to define an object list.

(C2) In either of (B1) or (C1), the 3D point cloud further comprises a set of (x, y, z) points and dividing the 3D point cloud into a plurality of boxes further comprises: sorting the points by x values in ascending order, followed by y values in ascending order; dividing the FOV into the plurality of boxes according to a dimension do such that adjacent boxes overlap with a dimension s; determining a set of indices $x_N = N \cdot d_0 (1-s)$ where N=a total number of the plurality of boxes; and sorting each point from the 3D point cloud into the plurality of boxes according to the x and y values of said each point.

(C3) In any of (B1) or (C1)-(C2), the plurality of 3D scanning devices further include scanning LIDARs.

(C4) In any of (B1) or (C1)-(C3), the detected objects in the FOV may be displayed so that the display may be plotted, controlled, scaled and colored based on relevant parameters.

(C5) In any of (B1) or (C1)-(C4), the processor analyzes the 3D point cloud in real time.

(C6) In any of (B1) or (C1)-(C5), the 3D point cloud is stored on the mobile platform and analyzed at a time after acquiring the 3D point cloud.

(C7) In any of (B1) or (C1)-(C6), removing data points further includes for box(n, m) of the plurality of boxes: determining a lowest z value (Z-Offset) of the data points in said each box; if the Z-Offset=0±$\delta_1$, then removing each data point in said each box with z=Z-Offset±$\delta_1$ and returning to said determining the lowest z value; and if the Z-Offset≠0±$\delta_1$, not removing any data point from said each box.

(C8) In any of (B1) or (C1)-(C7), aligning the data points in said each box includes determining an orientation and minimum slope of the data points in said each box, each box having an x-axis, y-axis and z-axis.

(C9) In any of (B1) or (C1)-(C8), determining an orientation and minimum slope of the data points includes for each box of the plurality of boxes: rotating the data points of said each box around its z axis through angles θ=0 to 359 degrees; determining, for each θ, if ten or more data points are within a $\delta_2$ of an x-axis, if so identifying a slope and average z value (z-Ave) of the data points within a $\delta_2$ of an x-axis and saving in a list with said each θ, otherwise saving a dummy value in the list; sorting the list in ascending order by slope, then by z-Ave to find the minimum slope (Real-Slope) and correct orientation (Real-θ); and rotating the data points in said each box using a rotation matrix $$R_{Real} = \begin{bmatrix} \cos(\text{Real}-\theta), & -\sin(\text{Real}-\theta), & 0 \\ \sin(\text{Real}-\theta), & \cos(\text{Real}-\theta), & 0 \\ 0 & 0 & 1 \end{bmatrix}.$$

(C10) In any of (B1) or (C1)-(C9), identifying a ρ angle includes, for said each box of the plurality of boxes: determining, for each data point of the data points in said each box, an elevation angle from the x-axis as $\rho = \tan^{-1} y/z$; saving each elevation angle to a list; calculating a standard deviation and average angle from the list; performing error correction on the data points by removing extraneous points; saving the standard deviation and average angle with the box; and designating the set of data points in the box as an object formed by a plane having an angle and orientation.

(C11) In any of (B1) or (C1)-(C10), merging boxes includes iterating through identified objects to detect shared points in adjacent objects; and if shared points are detected, merging the identified objects.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of identifying objects in a field of view (FOV) having dimensions $X_{MAX}$ and $Y_{MAX}$ by analyzing a 3D point cloud acquired by a plurality of 3D scanning devices attached to a mobile platform as the mobile platform moves through the FOV, said method performed by executing instructions stored on computer-readable media, wherein the instructions, when executed by a processor, perform the method comprising:

dividing the 3D point cloud into a plurality of boxes having a length and width, with adjacent boxes overlapping;

processing each box of the plurality of boxes to identify an object in said each box by:
removing data points from said each box having a height approximately equal to a minimum height of points in the FOV;
aligning the data points in said each box to an x-axis; and
determining a ρ angle of a plane defined by the data points of said each box and identifying an object as a plane having an angle and orientation; and merging boxes having overlapping points to define an object list of detected objects in the FOV.

2. The method of claim 1, wherein the 3D point cloud further comprises a set of (x, y, z) points and dividing the 3D point cloud into a plurality of boxes further comprises:

sorting the points by x values in ascending order, followed by y values in ascending order;
dividing the FOV into the plurality of boxes according to a dimension do such that adjacent boxes overlap with a dimension s;
determining a set of indices $x_N = N*d_0 (1-s)$ where N=a total number of the plurality of boxes; and
sorting each point from the 3D point cloud into the plurality of boxes according to the x and y values of said each point.

3. The method of claim 1, wherein removing data points further comprises:

for each box of the plurality of boxes:
determining a lowest z value (Z-Offset) of the data points in said each box;
if the Z-Offset=$0 \pm \delta_1$, then removing each data point in said each box with z=Z-Offset$\pm \delta_1$ and returning to said determining the lowest z value; and
if the Z-Offset$\neq 0 \pm \delta_1$, not removing any data point from said each box.

4. The method of claim 3, wherein aligning the data points in said each box further comprises determining an orientation and minimum slope of the data points in said each box, each box having an x-axis, y-axis and z-axis.

5. The method of claim 4, wherein determining an orientation and minimum slope of the data points further comprises for each box of the plurality of boxes:

rotating the data points of said each box around its z-axis through angles θ=0 to 359 degrees;
determining, for each θ, if ten or more data points are within a $\delta_2$ of an x-axis, if so identifying a slope and average z value (z-Ave) of the data points within a $\delta_2$ of an x-axis and saving in a list with said each θ, otherwise saving a dummy value in the list;
sorting the list in ascending order by slope, then by z-Ave to find the minimum slope (Real-Slope) and correct orientation (Real-θ); and
rotating the data points in said each box using a rotation matrix $$R_{Real} = \begin{bmatrix} \cos(\text{Real}-\theta), & -\sin(\text{Real}-\theta), & 0 \\ \sin(\text{Real}-\theta), & \cos(\text{Real}-\theta), & 0 \\ 0 & 0 & 1 \end{bmatrix}.$$

6. The method of claim 5, wherein identifying a ρ angle further comprises, for said each box of the plurality of boxes:

determining, for each data point of the data points in said each box, an elevation angle from the x-axis as $$\rho = \tan^{-1} \frac{y}{z};$$

saving each elevation angle to a list;
calculating a standard deviation and average angle from the list;
performing error correction on the data points by removing extraneous points;
saving the standard deviation and average angle with the box; and
designating the set of data points in the box as an object formed by a plane having an angle and orientation.

7. The method of claim 6, wherein merging boxes further comprises:

iterating through identified objects to detect shared points in adjacent objects; and
if shared points are detected, merging the identified objects.

8. A system for identifying objects in a field of view (FOV), comprising:

a mobile platform;
a plurality of 3D scanning devices attached to the mobile platform wherein the plurality of 3D scanning devices has overlapping fields of view and opposite scan directions; and
a processor and a memory storing machine readable instructions that, when executed by the processor, control the mobile platform and the plurality of 3D scanning devices to acquire a 3D point cloud describing the FOV as the mobile platform moves through the FOV;
wherein the processor further executes machine readable instructions to analyze the 3D point cloud and detect objects in the FOV by:
dividing the 3D point cloud into a plurality of overlapping boxes having a length and width;
processing each box of the plurality of boxes to identify an object in said each box by:
removing data points from said each box having a height approximately equal to a minimum height of points in the FOV;
aligning the data points in said each box to an x-axis; and
determining a ρ angle of a plane defined by the data points of said each box and identifying an object as a plane having an angle and orientation; and
merging boxes having overlapping points to define an object list.

9. The system of claim 8, wherein the plurality of 3D scanning devices further comprise scanning LIDARs.

10. The system of claim 8 further comprising a display for displaying the detected objects in the FOV so that the display may be plotted, controlled, scaled and colored based on relevant parameters.

11. The system of claim 8, wherein the processor analyzes the 3D point cloud in real time.

12. The system of claim 8, wherein the 3D point cloud is stored on the mobile platform and analyzed at a time after acquiring the 3D point cloud.

13. The system of claim 8, wherein removing data points further comprises:

for box(n, m) of the plurality of boxes:
determining a lowest z value (Z-Offset) of the data points in said each box;
if the Z-Offset=0±$\delta_1$, then removing each data point in said each box with z=Z-Offset±$\delta_1$ and returning to said determining the lowest z value; and
if the Z-Offset≠0±$\delta_1$, not removing any data point from said each box.

14. The system of claim 13, wherein aligning the data points in said each box further comprises determining an orientation and minimum slope of the data points in said each box, each box having an x-axis, y-axis and z-axis.

15. The system of claim 14, wherein determining an orientation and minimum slope of the data points further comprises for each box of the plurality of boxes:

rotating the data points of said each box around its z axis through angles θ=0 to 359 degrees;
determining, for each θ, if ten or more data points are within a $\delta_2$ of an x-axis, if so identifying a slope and average z value (z-Ave) of the data points within a $\delta_2$ of an x-axis and saving in a list with said each θ, otherwise saving a dummy value in the list;
sorting the list in ascending order by slope, then by z-Ave to find the minimum slope (Real-Slope) and correct orientation (Real-θ); and
rotating the data points in said each box using a rotation matrix $$R_{Real} = \begin{bmatrix} \cos(\text{Real} - \theta), & -\sin(\text{Real} - \theta), & 0 \\ \sin(\text{Real} - \theta), & \cos(\text{Real} - \theta), & 0 \\ 0 & 0 & 1 \end{bmatrix}.$$

16. The system of claim 15, wherein identifying a ρ angle further comprises, for said each box of the plurality of boxes:

determining, for each data point of the data points in said each box, an elevation angle from the x-axis as $$\rho = \tan^{-1}\frac{y}{z};$$

saving each elevation angle to a list;
calculating a standard deviation and average angle from the list;
performing error correction on the data points by removing extraneous points;
saving the standard deviation and average angle with the box; and
designating the set of data points in the box as an object formed by a plane having an angle and orientation.

17. The system of claim 16, wherein merging boxes further comprises:
iterating through identified objects to detect shared points in adjacent objects; and
if shared points are detected, merging the identified objects.

* * * * *